March 1, 1927.   T. F. UHLEMANN   1,619,551
FRAMING MECHANISM FOR MOTION PICTURE MACHINES
Original Filed June 3, 1920
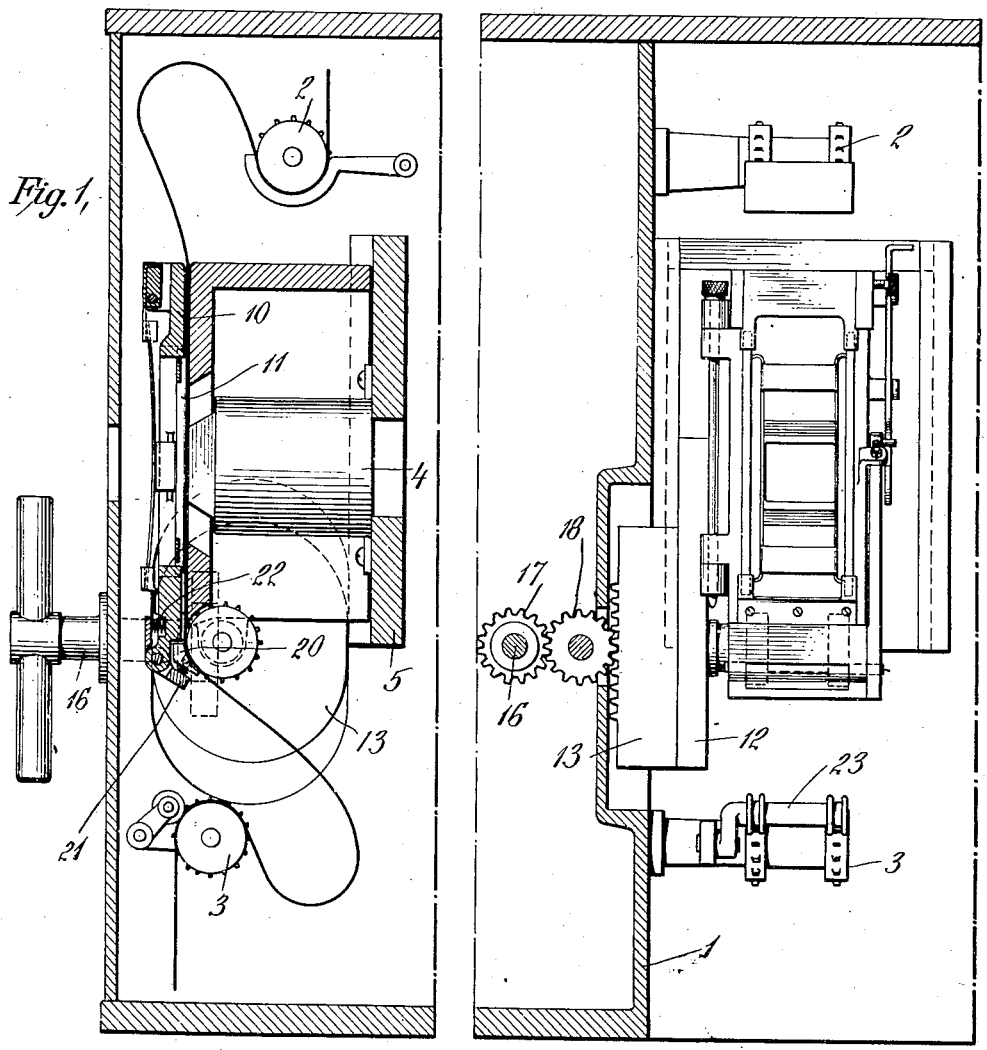
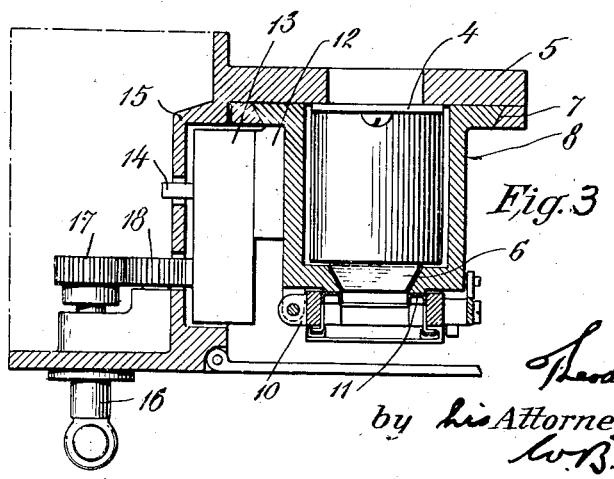
Inventor
Theodore F. Uhlemann
by his Attorney
W. B. Morton Patented Mar. 1, 1927.

1,619,551

UNITED STATES PATENT OFFICE.

THEODORE F. UHLEMANN, OF NEW YORK, N. Y., ASSIGNOR TO NICHOLAS POWER COMPANY, INC., OF NEW YORK, N. Y., A CORPORATION OF DELAWARE.

FRAMING MECHANISM FOR MOTION-PICTURE MACHINES.

Application filed June 3, 1920, Serial No. 386,143. Renewed May 8, 1926.

This invention relates to framing mechanism for motion picture machines and has for its object to provide a framing mechanism in which there is no displacement of the film with relation to the film guides at the aperture, the invention being more specifically an improvement on the type of framing illustrated in the Patent No. 1,184,126 to Nicholas Power, granted May 23, 1916.
In the framing mechanism disclosed in that patent, the adjustment of the film is accomplished by vertically shifting the intermittent sprocket, the sprocket being mounted on a carriage connected with the driving shaft of the machine through an articulated gearing which permits the movement of the sprocket without disturbing the driving connection. This form of framing mechanism has been found very satisfactory in use and it has been used in the majority of machines manufactured and sold in this country.

This framing mechanism is, however, open to the objection that when the sprocket is adjusted to points near the lower end of its range of adjustment a strip of film is left unsupported between the aperture plate and the sprocket. This film has a tendency to "buckle" or slightly overrun, which would destroy the definition of the picture and give a blurred and unsatisfactory projection. This tendency has heretofore been overcome by additional pressure on the friction shoes at the gate, which causes a more rapid wear of the film and under high speeds is not sufficient to hold without actual tearing.

By means of the present improvement this free length of film is avoided at all positions of adjustment of the sprocket by having film guides extend in such close proximity to the periphery of the sprocket wheel that the film cannot overrun and the necessity of undue pressure of the film guide is avoided.

In the accompanying drawings I have illustrated only so much of my improvement as necessary to disclose the invention, but it will be understood that the machine may have the sprocket and driving connections illustrated in the patent above referred to, or any other sprocket driving connections in which the sprocket is adjusted in a vertical line.

Referring to the drawings,

Figure 1 is a vertical section of the machine equipped with my improved framing mechanism;

Fig. 2 is a rear elevation partly in section of the machine shown in Fig. 1; and Fig. 3 is a transverse section on the line of the optical axis of the machine.

In said drawings, 1 indicates the frame or casing of the machine in which are mounted the customary upper and lower film-feeding sprockets 2 and 3, and the ray chute 4 which is supported by a plate 5 containing an aperture through which the light from the film reaches the lenses (not shown) by which the picture is projected on the screen. The ray chute terminates at its rear end in a reduced extension 6 of rectangular cross section and with its outer walls beveled in the manner shown.

Each edge of the plate 5 is provided with an undercut guide flange 7 for receiving the beveled edges of a sliding carriage or housing 8 which encloses the ray chute and is provided with a central opening of a width slightly greater than the width of the extension 6 and a height sufficient for an adjustment of the housing necessary to effect the full framing of the picture.

The rear face of the sliding carriage 8 serves as a guide for the film in its passage across the aperture, and for this purpose the plate is provided at its edges with slightly raised margins to engage the edges of the film and avoid contact with the face of the film. The film is held in position against the carriage by means of tension shoes 11 carried by gate 10 hinged to one edge of the carriage and vertically adjustable with the plate when the latter is adjusted to frame the picture.

The housing 8 has formed with it at one side a depending bracket 12 in which the shaft of the intermittent sprocket has its bearing, the shaft being driven by any suitable intermittent gear, not shown, but maintained in an oil-tight casing 13 attached to the side of the bracket, the intermittent couple being driven from a shaft 14 projecting from the casing and through a slot in the adjacent wall 15 of the machine frame and long enough to permit the desired framing movement. The shaft 14 will be driven through any suitable form of articulated gearing, such, for instance, as that shown in the above mentioned patent to Nicholas Power, from the driving shaft of the machine.

Any suitable means may be employed for adjusting the framing carriage. I have shown for the purpose a rotating hand shaft or spindle 16 supported in the rear wall of the casing and carrying at its inner end a gear 17 which meshes with an idler 18 whose teeth project through a slot in the wall 15 and mesh with the teeth of a vertical rack formed on the casing 13.

The housing will be maintained in its adjusted position by the friction of the working parts, preferably by having one of the edge guides of the plate 5 adjustable against the adjacent beveled edge of the housing, although the same results may be secured by providing the spindle 16 with a sufficiently tight bearing.

The gate 10 may also with advantage carry shoes 20 for holding the film against the teeth of the intermittent sprocket. As shown, these shoes are supported on a pivoted bracket 21 carried by the bottom of the gate, the bracket being spring-pressed toward the sprocket by a suitable spring 22. Springs are also interposed between the shoes and the bracket so as to permit individual adjustment of the separate shoes at each end of the sprocket to accommodate the uneven splices and other irregularities in the film.

Other forms of film guides may be employed in lieu of the shoes 20, for instance the ordinary flanged roller such as shown at 23 in connection with the continuously driven sprocket 3.

In my improved framing mechanism all parts which engage the free portion of the film between the upper and lower sprockets move as a unit in framing the picture, so that there is no variation in the tension on the picture at different positions of framing adjustment, or even during the actual period of adjustment. As the tension on the film is uniform it may be maintained at the minimum required to hold the film steady during the instant of projection. The framing movement puts no strain whatsoever on the film, as the loops above and below the framing carriage are always large enough to maintain the film slack at all times.

I claim:

1. In a framing mechanism for moving picture machines, film driving mechanism mounted in the frame of the machine, a fixed projection aperture, a sprocket adjustable with reference thereto to frame the picture, and film guides for maintaining the film in position for projection at said aperture, said film guides with said sprocket constituting a movable unit shiftable relative to the projector mechanism.

2. In a framing mechanism for moving picture machines, the combination of a fixed projection aperture, a sprocket adjustable with reference thereto to frame the picture, film guides for engaging the opposite faces of the film at the projection aperture for maintaining the film in proper position with relation to the aperture, and means for adjusting said film guides with the said sprocket as an integral unit movable relative to the other parts of the machine.

3. In a framing mechanism for moving picture machines, film driving mechanism mounted in the frame of the machine, a fixed projection aperture, a sprocket adjustable with reference thereto to frame the picture, a gate mounted to swing toward and from the aperture and maintain the film in position for projection, said gate being associated with the sprocket as an integral unit movable relative to the other parts of the machine to effect the framing adjustment, and means carried by the gate for maintaining the film in engagement with the sprocket teeth when the gate is closed.

4. In a framing mechanism for motion picture machines, the combination of a frame having a stationary projection aperture, film driving mechanism mounted on said frame an adjustable unit shiftable relative to the other parts of the projector mechanism consisting of a carriage mounted beneath said aperture for vertical adjustment with respect thereto, a film-feeding sprocket supported on said carriage and a film-guiding plate extending upwardly from said carriage on opposite sides of said aperture to maintain the film in position for projection at the aperture, said plate having its film-guiding surface extending into close proximity with the periphery of the sprocket.

5. In a motion picture machine, the combination of a fixed frame, upper and lower sprockets mounted in said frame for feeding the film to the machine, a carriage supported in said frame between said sprockets for vertical adjustment, an intermediate sprocket supported by said carriage, said frame having a fixed projection aperture above said intermediate sprocket, and film guides supported on said carriage extending upwardly beyond said aperture for maintaining the film in position for projection at the aperture.

6. In a motion picture projecting machine, a vertically movable film supported adapted to hold a portion of the film opposite the exposure opening, an intermittently operated sprocket to draw the film step by step through the support, a driving shaft for said sprocket supported in fixed bearings in the machine frame, means to move the support and sprocket in relation to the exposure opening, and means to maintain the relation of the sprocket to the support substantially constant during said movement.

Signed at New York in the county of New York and State of New York this 23rd day of December, 1919.

THEODORE F. UHLEMANN.